United States Patent
Hirai

(10) Patent No.: US 6,268,416 B1
(45) Date of Patent: Jul. 31, 2001

(54) COLORED SILICONE RUBBER ADHESIVE FILM AND METHODS OF USE

(75) Inventor: Kazuo Hirai, Chiba Prefecture (JP)

(73) Assignee: Dow Corning Toray Silicone Company, Ltd., Tokyo (JP)

(*) Notice: Subject to any disclaimer, the term of this patent is extended or adjusted under 35 U.S.C. 154(b) by 0 days.

(21) Appl. No.: 09/238,350

(22) Filed: Jan. 27, 1999

(30) Foreign Application Priority Data

Jan. 28, 1998 (JP) ................................................ 10-030489

(51) Int. Cl.$^7$ ............................... C08J 5/10; C08K 5/34; C08L 83/04
(52) U.S. Cl. ............................ 524/92; 524/93; 524/95; 524/267; 524/265; 524/492; 524/493
(58) Field of Search ................................. 524/492, 493, 524/494, 88, 93, 262, 265, 267, 268, 95, 92

(56) References Cited

U.S. PATENT DOCUMENTS 4,614,758 * 9/1986 Schwabe et al. ..................... 524/487
4,918,126 * 4/1990 Matsushita et al. .................. 524/188
5,366,768 * 11/1994 Kasari et al. ...................... 427/407.1

FOREIGN PATENT DOCUMENTS 7-119394    12/1995    (JP) .............................. C09J/183/04

* cited by examiner

Primary Examiner—James J. Seidleck
Assistant Examiner—U. K. Rajguru
(74) Attorney, Agent, or Firm—Alan Zombeck

(57) ABSTRACT

A colored silicone rubber adhesive film and methods of adhesion by means of the silicone rubber adhesive film are disclosed. The silicone rubber adhesive film comprises (A) an organopolysiloxane; (B) a wet method hydrophobized reinforcing silica; (C) an organohydridopolysiloxane; (D) an azo or anthroquinone pigment, and (E) a curing accelerator. The colored silicone rubber adhesive film is easily handled, possesses excellent workability, and most important, makes it possible to verify the degree and the point of completion of the curing due to the presence of the pigment.

1 Claim, 2 Drawing Sheets

COLORED SILICONE RUBBER ADHESIVE FILM AND METHODS OF USE

BACKGROUND OF THE INVENTION

The present invention relates to a silicone rubber adhesive film and to methods for adhering metal substrates to glass substrates.

Silicone rubber adhesive films are known. For example, Japanese Official Patent Publication (Kokoku) Heisei 7-119394 discloses a silicone rubber adhesive film prepared from an organopolysiloxane rubber and a wet method hydrophobized reinforcing silica with a curing accelerator. The silicone rubber adhesive film is simple to handle, possesses excellent workability, and is suitable for firmly securing together plates which have smooth surfaces and are made of such materials as glass, metal, etc. Furthermore, since the silicone rubber adhesive film can fix together glass and metal plates, it can be advantageously used as an adhesive for attaching knobs to glass entrance doors or to glass windows for buildings, for attaching mirrors (so called inner mirrors) to automobile windshield, etc. However, the adhesive strength of the silicone rubber adhesive film depends on the degree of its curing, and therefore there may be significant variations in the strength of the connections between structural elements secured with the use of this adhesive.

It is an object of the present invention to provide a colored silicone rubber adhesive film which is easily handled, possesses excellent workability, and most important, makes it possible to verify the degree and the point of completion of the curing in the silicone rubber adhesive film. When the latter is used for bonding various substrates together, it produces adhesive connections with improved uniformity.

Another object of the present invention is to provide methods for adhering metals substrates to glass substrates with the use of the colored silicone rubber adhesive film.

As a results of careful studies aimed at the solution of the problems described above, the present inventors have found certain organic pigments when present in a specific transparent silicone rubber adhesive film creates a colored film. The colored silicone rubber film become colorless upon subsequent heating and curing. This feature is used to verify the degree of curing, so that the moment at which the adhesive becomes completely colorless, curing completion is indicated. Furthermore, the inventors have discovered that the colored silicone rubber adhesive film produces bonded structures with improved uniformity in adhesive strength.

SUMMARY OF THE INVENTION

The present invention provides a colored silicone-rubber adhesive film composition comprising:
(A) 100 parts by weight of an organopolysiloxane with an average unit formula $R_aSiO_{(4-a)/2}$, where R is a substituted or unsubstituted hydrocarbon group with the provision that at least two R groups are alkenyl groups, and a is a number between 1.9 and 2.1;
(B) 30 to 150 parts by weight of a wet method hydrophobized reinforcing silica having a specific surface area exceeding 200 m$^2$/g, consisting essentially of SiO$_{4/2}$ units and organopolysiloxane units selected from the group consisting of R$_3$SiO$_{1/2}$ units, R$_2$SiO$_{2/2}$ units, RSiO$_{3/2}$ units, and mixtures thereof, where R is the same as defined above, wherein the mole ratio of the organopolysiloxane units to the SiO$_{4/2}$ units is within a range of 0.08 to 2.0;
(C) 0.1 to 10 parts by weight of an organohydridopolysiloxane comprising at least one silicon-bonded hydrogen atom;
(D) a pigment selected from the group of azo pigments and anthroquinone pigments present in an amount sufficient for coloring a silicone rubber adhesive film composition;
(E) a curing accelerator in an amount sufficient to cure the silicone rubber adhesive film composition;
wherein said colored silicone rubber adhesive film composition has a tensile strength of 1.5 kg/cm$^2$ to 5.0 kg/cm$^2$ at 25° C.

The inventors also provide a method of adhering a metal substrate to a glass substrate comprising:
a) coating the surface of a metal substrate with a primer composition comprising a organosilicon compound selected from the group of silanes and organosiloxane oligimers having an alkoxy group to form a primer layer;
b) laminating said primer layer with the colored silicone rubber adhesive film;
c) bringing the surface of said colored silicone rubber adhesive film into contact with a glass substrate;
d) curing said colored silicone rubber adhesive film composition at a temperature above 80° C. until the said colored silicone rubber adhesive film composition becomes colorless.

In another embodiment of adhering a metal substrate to a glass substrate, a method is provided comprising:
a) coating the surface of a metal substrate with a primer composition comprising,
  i) an organosilicon compound having an alkoxy group selected from the group of silanes and organosiloxane oligimers, and
  ii) a pigment selected from the group of azo pigments and anthroquinone pigments to form a colored primer layer on the surface of said metal substrate;
b) laminating said colored primer layer with a silicone rubber adhesive film composition comprising,
  (A) 100 parts by weight of an organopolysiloxane with an average unit formula $R_aSiO_{(4-a)/2}$, where R is a substituted or unsubstituted hydrocarbon group with the provisio that at least two R groups are alkenyl groups, and a is a number between 1.9 and 2.1;
  (B) 30 to 150 parts by weight of a wet method hydrophobized reinforcing silica having a specific surface area exceeding 200 m$^2$/g, consisting essentially of SiO$_{4/2}$ units and organopolysiloxane units selected from the group consisting of R$_3$SiO$_{1/2}$ units, R$_2$SiO$_{2/2}$ units, RSiO$_{3/2}$ units, and mixtures thereof, where R is the same as defined above, wherein the mole ratio of the organopolysiloxane units to the SiO$_{4/2}$ units is within a range of 0.08 to 2.0;
  (C) 0.1 to 10 parts by weight of an organohydridopolysiloxane comprising at least one silicon-bonded hydrogen atom;
  (D) a curing accelerator in an amount sufficient to cure the silicone rubber adhesive film composition;
wherein said silicone rubber adhesive film composition has a tensile strength of 1.5 kg/cm$^2$ to 5.0 kg/cm$^2$ in an uncured state at 25° C.;
c) maintaining contact between the silicone rubber adhesive film and the colored primer layer for at least one hour to form a colored silicone rubber adhesive layer;
d) bringing the surface of said colored silicone rubber adhesive film into contact with a glass substrate, and
e) curing said colored silicone rubber adhesive film by heating at a temperature above 80° C. until the film becomes colorless.

DETAILED DESCRIPTION OF THE INVENTION

Figure 1:
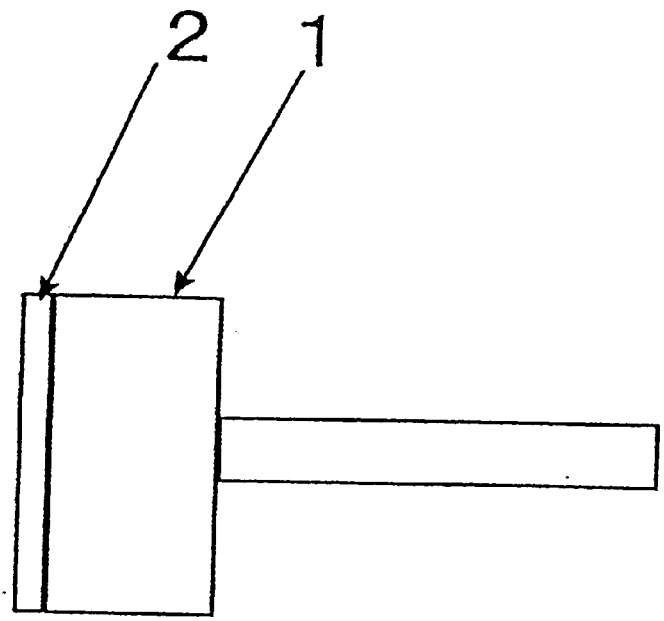
FIG. 1 is schematic view of the structure obtained in step (1) of Example 2 of the present invention (the structure consists of a stainless steel substrate with a layer of red primer applied onto the surface of the substrate).

The present invention provides a colored silicone-rubber adhesive film composition comprising:
(A) 100 parts by weight of an organopolysiloxane with an average unit formula $R_aSiO_{(4-a)/2}$, where R is a substituted or unsubstituted hydrocarbon group with the provisio that at least two R groups are alkenyl groups, and a is a number between 1.9 and 2.1;
(B) 30 to 150 parts by weight of a wet method hydrophobized reinforcing silica having a specific surface area exceeding 200 $m^2/g$, consisting essentially of $SiO_{4/2}$ units and organopolysiloxane units selected from the group consisting of $R_3SiO_{1/2}$ units, $R_2SiO_{2/2}$ units, $RSiO_{3/2}$ units, and mixtures thereof, where R is the same as defined above, wherein the mole ratio of the organopolysiloxane units to the $SiO_{4/2}$ units is within a range of 0.08 to 2.0;
(C) 0.1 to 10 parts by weight of an organohydridopolysiloxane comprising at least one silicon-bonded hydrogen atom;
(D) a pigment selected from the group of azo pigments and anthroquinone pigments present in an amount sufficient for coloring a silicone rubber adhesive film composition;
(E) a curing accelerator in an amount sufficient to cure the silicone rubber adhesive film composition;
wherein said colored silicone rubber adhesive film composition has a tensile strength of 1.5 $kg/cm^2$ to 5.0 $kg/cm^2$ at 25° C.

The organopolysiloxane component (A), of the silicone rubber composition of the present invention has a structure with an average unit formula $R_aSiO_{(4-a)/2}$, where R is a substituted or unsubstituted hydrocarbon group with the provisio that at least two R groups are alkenyl groups, and a is a number between 1.9 and 2.1. R in this structure designates an alkyl group such as; a methyl group, ethyl group, propyl group or a similar alkyl group; a vinyl group, allyl group or a similar alkenyl group; a cyclohexyl group or a similar cycloalkyl group; a (-phenylethyl group or a similar aralkyl group; a phenyl group, tolyl group, or a similar aryl group; a chloromethyl group, 3-chloropropyl group, 3,3,3-trifluoropropyl group, or a similar substituted or unsubstituted monovalent hydrocarbon group exemplified by a halogenated alkyl group; a is on average between 1.9 and 2.1. It is preferred that the organopolysiloxane contain at least two lower-alkenyl groups in one molecule. Structurally, this organopolysiloxane may be purely linear, or branched to some degree.

The viscosity and degree of polymerization of the organopolysiloxane may vary within the limits typical of organopolysiloxanes known in the art. However, it is preferred the organopolysiloxane used in this invention have a viscosity greater than $1\times10^6$ $mm^2/s$ at 25° C., and have an average degree of polymerization greater than 3000.

The organopolysiloxane is exemplified by the following compounds: a dimethylpolysiloxane having dimethylvinylsiloxy terminal group; a copolymer of a methylvinylsiloxane and dimethylsiloxane having dimethylvinylsiloxy terminal group; a copolymer of a methylphenylsiloxane and a dimethylsiloxane having dimethylvinylsiloxy terminal group; a copolymer of a methylvinylsiloxane, methylphenylsiloxane, and a dimethylsiloxane having a dimethylvinylsiloxy terminal group; a copolymer of methylvinylsiloxane and a dimethylsiloxane having a trimethylsiloxy terminal group; a copolymer of a methylvinylsiloxane, methylphenylsiloxane, and a dimethylsiloxane having trimethylsiloxy terminal group, etc.

The wet method hydrophobized reinforcing silica, which constitutes component (B) of the composition of the present invention, improves the tensile strength of the silicone rubber adhesive film in an uncured state. Furthermore, it improves the adhesion of the silicone rubber adhesive to various substrates after heating and curing, in particular improving the durability of the adhesive connection. The wet method hydrophobized reinforcing silica has a specific surface area above 200 $m^2/g$, it comprises organopolysiloxane units selected from a group consisting essentially of $R_3SiO_{1/2}$ units, $R_2SiO_{2/2}$ units, $RSiO_{3/2}$ units or their mixtures (where R is the same as defined above) and $SiO_{4/2}$ units. The organopolysiloxane units should be used in an amount sufficient for hydrophobization of the reinforcing silica. It is preferred that a mole ratio of organopolysiloxane units to $SiO_{4/2}$ units be within a range of 0.08 to 1.5. If this ratio is less than 0.08, the composition may lose its adhesive characteristics, and if the ratio exceeds 1.5, the reinforcing properties are impaired so that the composition cannot be used as a filler with reinforcing properties. This component can be produced by methods described in Official Japanese Patent Publication (Kokoku) 61-56255 or in U.S. Pat. No. 4,418,165, incorporated herein by reference.

The organohydridopolysiloxane containing a silicon-bonded hydrogen atom which constitutes component (C), is represented by the following compounds: a methylhydridopolysiloxane having a trimethylsiloxy group at both molecular terminals; a copolymer of a methylhydridosiloxane and a dimethylsiloxane having trimethylsiloxy groups on both terminals; a copolymer of a methylhydridosiloxane and a methylphenylsiloxane having dimethylphenylsiloxy groups on both terminals; and a copolymer consisting of a cyclic methylhydridopolysiloxane, dimethylhydridosiloxane units, and $SiO_{4/2}$ units.

The curing accelerator, which constitutes component (E), is a catalyst for curing the composition of the present invention. This catalyst may be represented by an organic peroxide, a combination of an organic peroxide with a platinum catalyst, or a platinum catalyst alone. The following are examples of organic peroxides: dicumyl peroxide, di-t-butyl peroxide, t-butylcumyl peroxide, 2,5-dimethyl-2,5-di (t-butylperoxy)hexane, 2,5-dimthyl-2,5-di (t-butylperoxy)hexyne, 1,1-bis(t-butylperoxy) 3,3,5-trimethylcyclohexane, benzoyl peroxide, O-methylbenzoyl peroxide, P-methylbenzoyl peroxide.

Platinum catalysts are exemplified by chloroplatinic acid, an alcoholic denaturate of chloroplatinic acid, platinum chelate, a coordination compound of chloroplatinic acid and olefins, a complex of chloroplatinic acid and tetramethyldivinylsiloxane. It is preferred that this component be used in an amount sufficient for curing the composition of the present invention. The organic peroxide is typically used in an amount of 0.1 to 10 parts by weight. The platinum catalyst, is typically used in an amount of 1 to 500 parts by weight, preferably 1 to 300 parts by weight against $1\times10^6$ parts by weight of component (A).

The colored silicone rubber adhesive film composition of the present invention comprises components (A) through (E). However, the composition may also contain an adhesion accelerator as a component (F) which may be added for improving adhesion to the substrate. Examples of this component are organoalkoxysilanes which contain mercapto groups, amino groups, vinyl groups, allyl groups, hexenyl groups, methacryloxy groups, acryloxy groups, glycidoxy groups, or similar organic functional groups, or the products of partial hydrolyzation and condensation of the organoalkoxysilanes.

The said adhesion accelerators are represented by γ-mercaptopropyl-trimethoxysilane, γ-mercaptopropyl-methyldimethoxysilane, γ-(2-aminoethyl)-aminopropyl trimethoxysilane, γ-(2-aminoethyl)-aminopropylmethyl dimethoxysilane, γ-methacryloxypropyl trimethoxysilane, γ-acryloxypropyl trimethoxysilane, vinyltri (methoxyethoxy)silane, allyltrimethoxy silane, γ-glycidoxypropyl trimethoxysilane, or by the products of their partial hydrolyzation. If used, it is preferred that the adhesion accelerator be used in an amount of 0.1 to 10 parts by weight per 100 parts of component (A).

The silicone rubber adhesive film of the present invention is obtained by first kneading the components (A) through (E) in predetermined proportions to form a silicone rubber composition. Kneading can be accomplished, for example, with a mixer such as a two roller type, a kneader, a Banbury's mixer, etc. It is preferred that the silicone rubber composition have a tensile strength within the range of 1.5 $kg/cm^2$ to 5.0 $kg/cm^2$, and preferably between 2.0 $kg/cm^2$ to 4.0 $kg/cm^2$ in an uncured state at 25° C. A tensile strength below 1.5 $kg/cm^2$ will lead either to deformation in shape during handling, or to tearing. If, on the other hand, the tensile strength exceeds 5.0 $kg/cm^2$, the composition will be easy to handle, but will be subject to reverse plastization. Subsequently, reverse plastization causes the composition to become hard, loose its plasticity, and develop cracks. The tensile strength in the uncured silicone rubber composition of the present invention is measured in accordance with the procedure of JIS K 6301 (JIS-Japanese Industrial Standard).

The silicone rubber adhesive film of the present invention can be produced for example by extruding the silicone rubber composition through an extruder having a nozzle of appropriate dimensions. Alternatively, the silicone rubber composition can be shaped into a film-like form between calender rollers and then split into several strips.

It is important that the silicone rubber adhesive film of the present invention have a uniform thickness. It is preferred that this thickness be within a range of 0.01 to 10 mm, preferably between 0.05 mm and 5 mm. If the silicone rubber adhesive film is thinner than 0.01 mm, it will be difficult to form into a film-like shape. If it is thicker than 10 mm, the increased stress on the interface results in a decrease in adhesive strength or to an increase in creeping.

For practical use of the silicone rubber adhesive film of the present invention, it is advantageous to stamp out pieces that match in shape the substrate to be adhered.

The silicone rubber adhesive film of the present invention is colored by the addition of a pigment. The pigment, component (D), is selected from azo pigments or anthraquinone pigments. The azo pigment are exemplified by monoazo pigments, polyazo pigments, pyrazolone pigments, stilbene azo pigments, thiazole azo pigments. Disazo pigments are represented by Alzol Red (product of Futaba Chemical Research Institute), Orient Oil Red 5B (trademark of Orient Chemical Industries Co., Ltd.), Casset Red 802 (trademark of Nippon Kayaku Co., Ltd.), Oil Red SA Extra (trademark of Shirado Chemical Research Institute), etc. Anthraquinone pigments are exemplified by Casset Blue-814 (trademark of Nippon Kayaku Co., Ltd.), Oriental Oil Blue-K (trademark of Toyo Ink, Co., Ltd.), Sumiplast Blue-CA (trademark of Sumitomo Chemical Industries Co., Inc.), etc. A red azo pigment, xylyl-azoxylydene-2-napthole, is a preferred pigment.

It is preferred that pigment component (D) be soluble in the organopolysiloxane of component (A). Component (D) should be used in an amount sufficient for coloring the silicone rubber composition. Typically, it can be used in an amount of 0.05 to 2,000 ppm relative to the amount of component (A). If the pigment is used in an amount less than 0.05 ppm, the effect of the coloration of the silicone rubber adhesive film of the invention will be insufficient. If the amount of pigment exceeds 2,000 ppm, the film-like adhesive becomes too hard and will be unsuitable for the purposes of the present invention.

There are two methods by which component (D) can be added to the silicone rubber adhesive film of the present invention. In the first method, component (D) is introduced directly to the silicone rubber composition by kneading the pigment into the mixture. Alternatively, the pigment is impregnated into the silicone rubber adhesive film.

The method of impregnation involves contacting the surface of the silicone rubber adhesive film with a pigment, component (D) for approximately one hour.

For bonding a metal substrate to a glass substrate, the surface of the metal substrate is often first treated with a primer. This improves the adhesion of the silicone rubber adhesive film to the metal substrate. In these cases, component (D) is first added to the primer composition, and then the silicone rubber adhesive film is contacted with the surface of the primer-treated surface, wherein component (D) penetrates from the primer-treated surface to color the silicone rubber adhesive film.

One embodiment of the method of adhesion of the instant invention involves;
1) coating the surface of a metal substrate with a primer composition comprising a organosilicon compound selected from the group of silanes and organosiloxane oligimers having an alkoxy group to form a primer layer;
2) laminating said primer layer with the colored silicone rubber adhesive film described above;
3) bringing the surface of said colored silicone rubber adhesive film into contact with a glass substrate;
4) curing said colored silicone rubber adhesive film composition at a temperature above 80° C. until the said colored silicone rubber adhesive film composition becomes colorless.

The first step comprises coating the surface of a metal substrate with a primer composition having its main components in the form of an organosilane which contains at least one alkoxy group or an organosiloxane oligomer which contains at least one alkoxy group. The metal substrate is exemplified by stainless steel, iron, aluminum, or zinc. The primer composition used may have as its main components an organosilane which contains alkoxy groups and/or an organosiloxane oligomer which contains alkoxy groups. The primer composition may or may not contain an azo pigment or an anthraquinone pigment. The primer composition may consist of, for example, an organic solvent, an organic titanium compound and a polysiloxane which contains an ethoxy group such as tetraethoxysilane or a product of hydrolysis and condensation of a tetraethoxysilane. There are no particular limitations regarding how the primer composition is to be applied. In the case of the primer composition containing an organic solvent, it is preferred that the organic solvent be completely removed by air drying after the primer composition has been applied.

In step 2, the colored silicone rubber adhesive film, as described above, is contacted with the primer-treated surface obtained in step 1. If desired, the silicone rubber adhesive film can be cut into a shape matching the shape of the metal substrate, and then the cut-out silicone rubber adhesive film is placed onto the primer-treated layer. In performing this step it is preferable to adhere the colored silicone rubber adhesive film to the primer-treated surface with the application of light pressure.

Then in step (3) a glass substrate is contacted with the surface of the silicone rubber adhesive film. It is preferred that contact between the glass substrate and the silicone rubber adhesive film be carried out under pressure sufficient for compressing and deforming the film-like adhesive so that sufficient contact occurs between the silicone rubber adhesive film and the glass substrate. Normally, this pressure should be within a range of 0.1 to 20 kg/m$^2$.

In step (4), the film-like adhesive is then cured by heating to a temperature exceeding 80° C. As a result, the color obtained due to the azo pigment or the anthraquinone pigment fades and heating is continued until complete decoloration. It is preferred that heating be within a temperature range of 100–170° C.

As a result, an integral structure consisting of a metal substrate and a glass substrate strongly bonded to each other is thus obtained.

In another embodiment of the method of the invention comprises the following steps:
1) coating the surface of a metal substrate with a primer composition comprising,
    i) an organosilicon compound having an alkoxy group selected from the group of silanes and organosiloxane oligimers, and
    ii) a pigment selected from the group of azo pigments and anthroquinone pigments to form a colored primer layer on the surface of said metal substrate;
2) laminating said colored primer layer with a silicone rubber adhesive film composition comprising,
    A) 100 parts by weight of an organopolysiloxane with an average unit formula $R_aSiO_{(4-a)/2}$, where R is a substituted or unsubstituted hydrocarbon group with the provisio that at least two R groups are alkenyl groups, and a is a number between 1.9 and 2.1;
    (B) 30 to 150 parts by weight of a wet method hydrophobized reinforcing silica having a specific surface area exceeding 200 m$^2$/g, consisting essentially of SiO$_{4/2}$ units and organopolysiloxane units selected from the group consisting of R$_3$SiO$_{1/2}$ units, R$_2$SiO$_{2/2}$ units, RSiO$_{3/2}$ units, and mixtures thereof, where R is the same as defined above, wherein the mole ratio of the organopolysiloxane units to the SiO$_{4/2}$ units is within a range of 0.08 to 2.0;
    (C) 0.1 to 10 parts by weight of an organohydridopolysiloxane comprising at least one silicon-bonded hydrogen atom;
    (E) a curing accelerator in an amount sufficient to cure the silicone rubber adhesive film composition;
wherein said silicone rubber adhesive film composition has a tensile strength of 1.5 kg/cm$^2$ to 5.0 kg/cm$^2$ at 25° C.;
3) maintaining contact between the silicone rubber adhesive film and the colored primer layer for at least one hour to form a colored silicone rubber adhesive film;
4) bringing the surface of said colored silicone rubber adhesive film into contact with a glass substrate, and
5) curing said colored silicone rubber adhesive film by heating at a temperature above 80° C. until the film becomes colorless.

In carrying out the method of this embodiment of the invention, first in Step (1) a primer composition that contains an azo pigment or an anthraquinone pigment is applied onto the surface of a metal substrate. The metal substrate can be made of stainless steel, iron, aluminum, zinc, etc. The primer composition comprises an azo pigment or an anthraquinone pigment, as described above, added to a composition which has as its main components an organosilane with alkoxy groups or an organopolysiloxane with alkoxy groups as described above. The primer composition may comprise, for example, an organic solvent, an azo or anthraquinone pigment, an organic titanium compound, and a siloxane oligomer with an ethoxy group which is either a tetraethoxysilane itself or a product of hydrolysis and condensation of the tetraethoxysilane. There are no special limitations regarding the manner in which the primer composition has to be applied. When the primer composition contains an organic solvent, the organic solvent is generally removed by air drying after the primer composition has been applied.

In step (2) of this embodied method, the silicone rubber adhesive film of the present invention is brought into contact with the primer-treated surface obtained in Step (1). If desired, the silicone rubber adhesive film can be cut into a shape matching the shape of the metal substrate. The cut-out silicone rubber adhesive film is then placed onto the primer-treated layer. It is preferable to adhere the silicone rubber adhesive film to the primer-treated surface with the application of light pressure.

In step (3), the unit is then left intact for at least one hour to allow the azo or anthraquinone pigment to penetrate the silicone rubber adhesive film. There are no particular limitations regarding the time the unit should be left intact for penetration. The time will depend on the solubility of the azo or anthraquinone pigment in the silicone rubber adhesive film, or on the thickness of the silicone rubber adhesive film, etc. Generally, the time should exceed one hour and preferably exceed 24 hours.

Then in step (4), a glass substrate is brought into contact with the surface of the silicone rubber adhesive film. The glass substrate and the silicone rubber adhesive film is generally contacted with sufficient pressure to compress and deform the silicone rubber adhesive. Normally, this pressure should be within a range of 0.1 to 20 kg/cm$^2$.

In step (5), the adhesive film is then cured by heating at a temperature exceeding 80° C. and the color obtained due to the azo pigment or the anthraquinone pigment fades. Heating is continued until the silicone rubber adhesive film becomes colorless. A temperature range of 100–170° C. is preferred to assure the metal substrate and the glass substrate are strongly bonded to each other.

The silicone rubber adhesive film described above is convenient for handling and possesses excellent workability. In particular, when it is used for applying a substrate for adhesion, the degree of curing of the silicone rubber adhesive film is controlled and creates an adhesive connection with greater uniformity in the adhesive strength. This composition can be used in fields which require such improved adhesion properties, for example, bonding glass parts to metal parts. Examples are attaching knobs to glass doors or to glass windows in buildings, and for attaching mirrors (so called inner mirrors) to automobile windshield, etc.

The invention will be further described with reference to practical examples. In the following practical examples all parts are given in terms of parts by weight and all percentages are given as wt. %.

EXAMPLES

The following procedure was used for measuring the tensile strength of an uncured silicone rubber composition. A silicone rubber composition was formed into a 2 mm thick sheet by passing it between two rollers. The obtained sheet-like product was stamped into a standard dumbbell-type sample #2 in accordance with JIS K 6301 (Vulcanized Rubber Physical Test Processes). After that, the tensile strength of the dumbbell sample was tested in accordance with the provisions of JIS K 6301. Measurements were carried out at a temperature of 25° C.

Reference Example 1
Synthesis of Wet Method Hydrophobized Reinforcing Silica A glass reactor was loaded with 118 g of methanol, 32 g of concentrated aqueous ammonium hydroxide and 41 g of dimethyl-dimethoxysilane, and these components were stirred by means of electromagnetic stirring until a uniform mixture appeared. While the mixture was stirred vigorously, 96 g of a methyl-orthosilicate was added. After 10 seconds, the reaction product turned into a gel-like substance, stirring was stopped, and the obtained product was left intact, in a closed cool room for one week, whereby a dispersion of wet-method wet method hydrophobized reinforcing silica was obtained. The methanol and gaseous ammonia were removed from the silica dispersion. The BET surface area of the wet method hydrophobized reinforcing silica was measured and the results of the measurements showed that the obtained wet-method hydrophobized reinforcing silica had a specific surface area equal to 620 $m^2/g$.

Reference Example 2
Synthesis of Wet Method Hydrophobized Reinforcing Silica First, a hydrophobization agent was prepared by a method described in Official Japanese Patent Publication (Kokoku) No. 61-56255. A reaction was conducted for 2 hours at 105° C. with 277 g of octamethyl cyclotetrasiloxane, 4.6 g of 1,3,5,7-tetramethyl-1,3,5,7-tetravinylsilox 517 g of methyltrimethoxysilane, and 0.43 g of potassium hydroxide as a catalyst. As a result, a hydrophobization agent consisting of a ring-opened rearranged organopolysiloxane was prepared. The potassium hydroxide was neutralized by carbon gas. Analysis of the obtained polysiloxane showed that the product was made of a linear organopolysiloxane with 0.7 mole % of methyl vinyl siloxy groups.

Then, the wet method hydrophobized reinforcing silica was synthesized as follows with the use of the obtained hydrophobization agent. A glass reactor was loaded with 118 g of methanol, 32 g of concentrated aqueous ammonium hydroxide and 39 g of the hydrophobizaton agent obtained above. These components were stirred by means of electromagnetic stirring until a uniform mixture appeared. While the mixture was stirred vigorously, 96 g of a methyl-orthosilicate was added. After 10 seconds, the reaction product turned into a gel-like substance, stirring was stopped, and the obtained product was left intact, in a closed cool room to age for one week whereby a dispersion of wet method hydrophobized reinforcing silica was obtained.

The methanol and gaseous ammonia were removed from the silica dispersion. The BET surface area of the wet-method hydrophobized reinforcing silica was measured and the results of the measurements showed that the obtained wet-method hydrophobized reinforcing silica had a specific surface area equal to 540 $m^2/g$.

Example 1

First, 300 parts of the wet method hydrophobized reinforcing silica dispersion (with the silica comprising 25% of the weight) obtained in Reference Example 1 and 100 parts of a copolymer rubber (with a degree of polymerization equaling 3,000) obtained from methylvinyisiloxane and dimethylsiloxane having molecular chain terminals capped with dimethylvinylsiloxy groups (where dimethylsiloxane units comprised 99.63 mole % and methylvinylsiloxane units comprised 0.37 mole %) were loaded into a kneader-mixer and mixed. The solvent was removed by heating to 90° C. After the volatile components were completely removed, a silicone rubber base was obtained. Then, 100 parts of the obtained silicone rubber base were combined with the following components: 1.5 parts of a copolymer (where the content of the silicon-bonded hydrogen atoms was 1.52 wt. %) of dimethylsiloxane and methylhydridosiloxane having a viscosity of 7 $mm^2/s$ at 25° C. and molecular terminals blocked with trimethylsiloxy groups having a viscosity of 7 $mm^2/s$ at 25° C.; a complex of a chloroplatinic acid and tetramethyldivinylsiloxane in an amount that makes the content of a platinum metal catalyst equal to 10 ppm; 100 ppm of methyl-tris(methylisobutynoxy)silane; 0.5 parts of γ-methacryloxypropyl trimethoxy silane, 0.5 parts of γ-glycidoxypropyl-trimethoxysilane; 0.4 parts of glycerin monoaryl ether. As a result, a transparent silicone rubber composition was prepared. The obtained silicone rubber composition was combined with 0.03 parts of a red azo pigment (xylyl-azoxylydene-2-napthole), to produce a silicone rubber composition of red color. Tensile strength of this silicone rubber composition in an uncured state was measured and showed a magnitude of 2.6 $kg/cm^2$. The obtained silicone rubber composition was extruded into a film-like product through an appropriate extruder nozzle, whereby a 1.0 mm-thick and 5 cm-wide silicone rubber adhesive film was produced. The obtained silicone rubber adhesive was cut with a cutter knife into 1.0 mm-thick, 2.0 cm-wide, and 3 cm-long pieces of a red silicone rubber adhesive film.

Meanwhile, the surface of a stainless-steel substrate (SUS403,20×30 mm) was coated with a primer composition consisting of 5 parts of a product of hydrolysis and condensation of tetraethoxysilane, 1 part of N-butyltitanate, and 94 parts of N-heptane. The coating was then left intact at room temperature for 24 hours and air dried, whereby a structure having a transparent primer layer formed on the surface of the stainless-steel substrate, was obtained. The red silicone rubber adhesive film was placed onto the surface of the primer layer, whereby a laminated structure in which the film-like silicone rubber adhesive was adhered to the stainless-steel substrate via the primer layer, was produced. The surface of the silicone rubber adhesive film was then pressed to a preliminarily prepared glass substrate under a pressure of 13 $kg/cm^2$ at 130°C., and the adhesive connection was cured by heating the adhesive until the red color completely disappeared and the adhesive was thus cured. In this case, heating was continued for 25 min. The obtained assembly comprised an integral unit consisting of a stainless-steel substrate and a glass substrate strongly adhered to each other via a transparent silicone rubber adhesive film. Measurement showed that in this structure the strength of the adhesive connection between the stainless-steel substrate and the glass substrate was 52 kg/cm$^2$.

Example 2

First, 300 parts of the wet-method hydrophobized reinforcing silica dispersion (with the silica comprising 25% of the weight) obtained in Reference Example 2 and 100 parts of a copolymer rubber (with a degree of polymerization equaling 3,000) obtained from methylvinylsiloxane and dimethylsiloxane having molecular chain terminals capped with dimethylvinylsiloxy groups (where dimethylsiloxane units comprised 99.63 mole % and methylvinylsiloxane units comprised 0.37 mole %) were loaded into a kneader-mixer and mixed. The solvent was removed by heating to 90° C. After the volatile components were completely removed, a silicone rubber base was obtained. Then, 100 parts of the obtained silicone rubber base were combined with the following components: 1.5 parts of a copolymer (where the contents of the silicon-bonded hydrogen atoms was 1.52 wt. %) of dimethylsiloxane and methylhydridosiloxane having molecular terminals blocked with trimethylsiloxy groups with a viscosity of 7 mm$^2$/s at 25° C.; a complex of a chloroplatinic acid and tetramethyldivinylsiloxane in an amount that makes the content of a platinum metal catalyst equal to 10 ppm; 100 ppm of methyl-tris(methylisobutynoxy)silane; 0.5 parts of γ-methacryloxypropyl trimethoxysilane, 0.5 parts of γ-glycidoxypropyl-trimethoxysilane; and 0.4 parts of glycerin monoaryl ether. As a result, a transparent silicone rubber composition was prepared. Tensile strength of this silicone rubber composition in an uncured state was measured and showed a magnitude within the range of 3.0 to 3.5 kg/cm$^2$. The obtained silicone rubber composition was extruded into a film-like product through an appropriate extruder nozzle, whereby a 0.75 mm-thick and 5 cm-wide silicone rubber adhesive film was produced. The obtained silicone rubber adhesive was cut with a cutter knife into 0.75 mm-thick, 2.0 cm-wide, and 3 cm-long pieces of a transparent silicone rubber adhesive film.

Meanwhile, the surface of a stainless-steel substrate, as shown in FIG. 1 (1), (SUS403, 20×30 mm) was coated with a primer composition colored red by means of an azo-type pigment, as shown in FIG. 1 (2). The red primer composition was prepared from 5 parts of the product of hydrolysis and condensation of tetraethoxysilane, 1 part of N-butyltitanate, 94 parts of N-heptane, and 1 part of red pigment (xylylazoxylydene-2-naphthol). According to Step (1), the coating was left intact at room temperature for 24 hours and air dried, whereby a structure having a red primer layer formed on the surface of the stainless-steel substrate was obtained (see FIG. 1).

Figure 2:
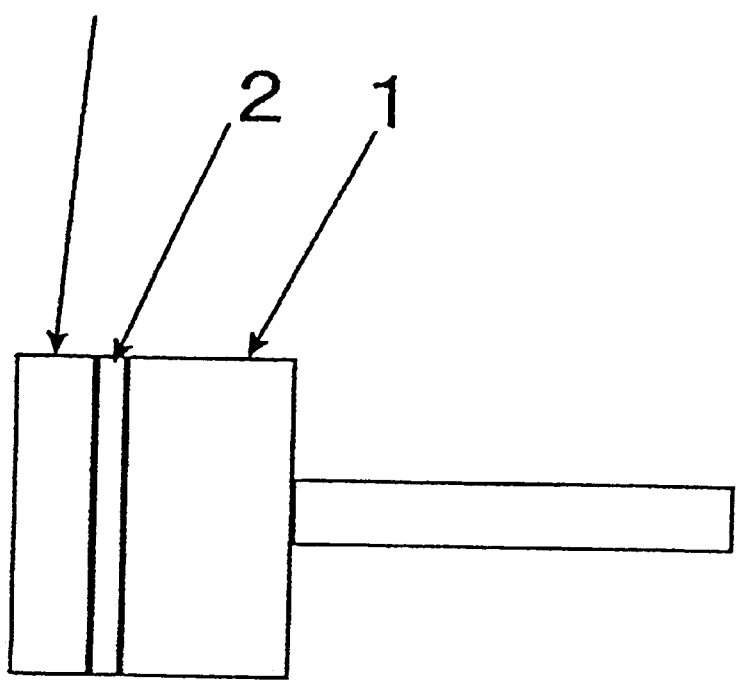
FIG. 2 is a schematic view of a laminated structure consisting of a transparent silicone rubber adhesive film layer applied onto the surface of the primer layer obtained in the initial part of step (2) of Example 2 of the invention.
Figure 3:
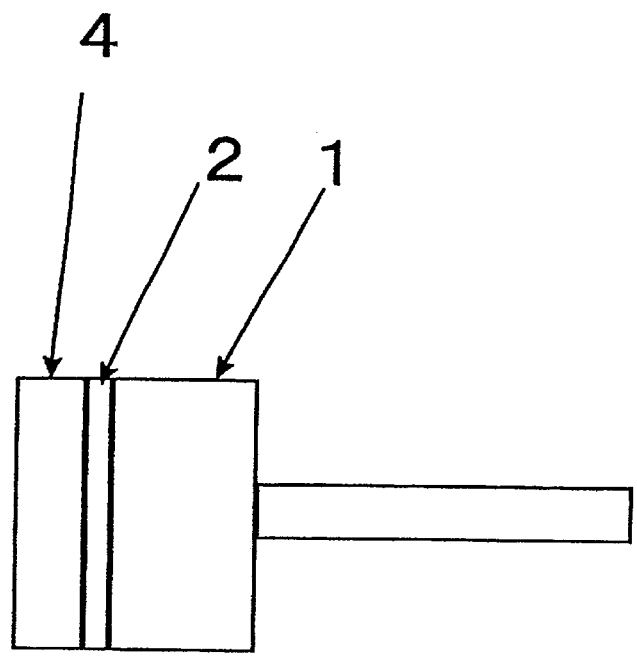
FIG. 3 is a schematic view of the structure obtained in the final stage of step 2 of Example 2 (this structure was obtained by forming a red primer layer on the surface of the stainless-steel substrate, placing a red silicone rubber adhesive film onto the surface of the primer layer, and then bringing the surface of the colored silicone rubber adhesive film into contact with the surface of a glass substrate).

In Step (2), the transparent silicone rubber adhesive film as shown in FIG. 2 (3) was placed onto the surface of the primer layer, whereby a laminated structure in which the film-like silicone-rubber adhesive was attached to the stainless-steel substrate via the primer layer, was produced (see FIG. 2). The obtained structure was left intact for 7 days at room temperature, whereby the transparent film-like silicone turned red (see FIG. 3 (4)).

Figure 4:
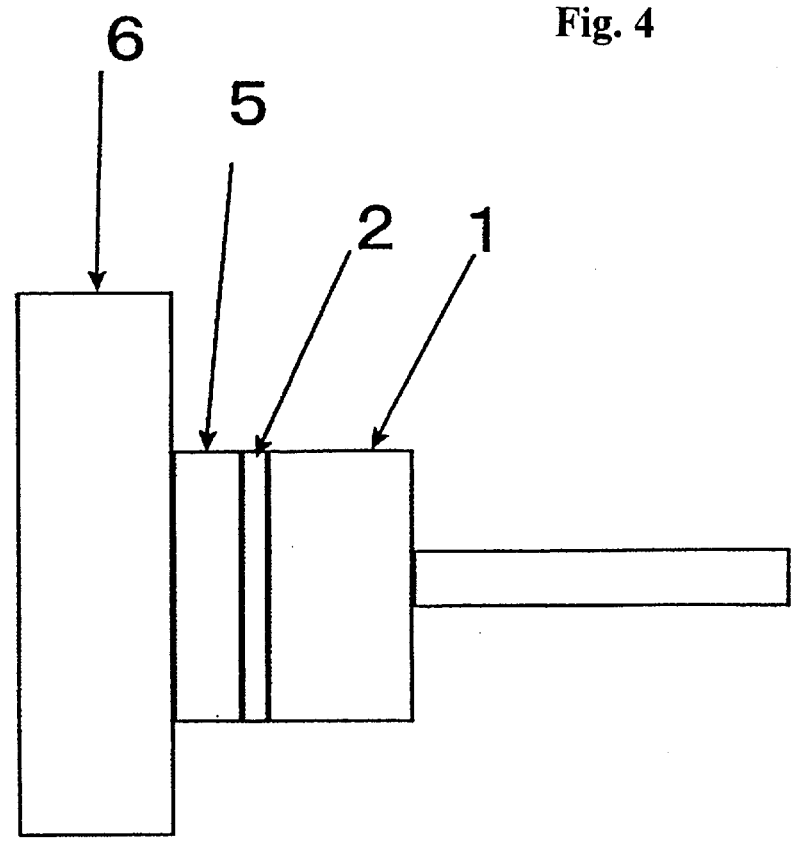
FIG. 4 is a schematic view of an integral structure in which a metal substrate obtained in Example 2 of the invention is adhesively connected to a glass substrate via a transparent cured silicone rubber adhesive film.

Then in Step (3), the surface of the silicone rubber adhesive film was pressed to a preliminarily prepared glass substrate, as shown in FIG. 4 (6) under a pressure of 13 kg/cm$^2$ at 130° C., and the adhesive connection was cured by heating the adhesive until the red had completely disappeared. In this case, heating was continued for 30 min. The obtained assembly comprised an integral unit consisting of a stainless-steel substrate and a glass substrate strongly adhered to each other via a transparent silicone rubber adhesive film (see FIG. 4 (5)). Measurement showed that in this structure the strength of the adhesive connection between the stainless-steel substrate and the glass substrate was 62 kg/cm$^2$.

It has been shown that the colored film-like silicone-rubber adhesive of the invention is extremely convenient for handling and possesses good workability. In particular, when it is used for adhesion of substrates, it becomes possible to verify the degree of curing of the silicone rubber adhesive film to determine the moment when the curing is completed and to produce a bonded structure with reduced scattering in the adhesive strength.

That which is claimed:

1. A colored silicone-rubber adhesive film composition comprising:
   (A) 100 parts by weight of an organopolysiloxane with an average unit formula $R_a SiO_{(4-a)/2}$, where R is a substituted or unsubstituted hydrocarbon group with the proviso that at least two R groups are alkenyl groups, and a is a number between 1.9 and 2.1;
   (B) 30 to 150 parts by weight of a wet method hydrophobized reinforcing silica having a specific surface area exceeding 200 m$^2$/g, consisting essentially of $SiO_{4/2}$ units and organopolysiloxane units selected from the group consisting of $R_3SiO_{1/2}$ units, $R_2SiO_{2/2}$ units, $RSiO_{3/2}$ units, and mixtures thereof, where R is the same as defined above, and wherein the mole ratio of the organopolysiloxane units to the $SiO_{4/2}$ units is within a range of 0.08 to 2.0;
   (C) 0.1 to 10 parts by weight of an organohydridopolysiloxane comprising at least one silicon-bonded hydrogen atom;
   (D) a xylyl-azoxylydene-2-napthole pigment; and
   (E) a curing accelerator in an amount sufficient to cure the silicone rubber adhesive film composition;

wherein said colored silicone rubber adhesive film composition has a tensile strength of 1.5 kg/cm$^2$ to 5.0 kg/cm$^2$ at 25° C.

* * * * *